(12) United States Patent
Spencer (10) Patent No.: US 11,292,400 B2
(45) Date of Patent: Apr. 5, 2022

(54) TOP MOUNT TOOLBOX SYSTEM

(71) Applicant: Truxedo, Inc., Ann Arbor, MI (US)

(72) Inventor: Michael R. Spencer, Hubbard, NE (US)

(73) Assignee: TRUXEDO, INC., Ann Arbor, MI (US)

( * ) Notice: Subject to any disclaimer, the term of this patent is extended or adjusted under 35 U.S.C. 154(b) by 0 days.

(21) Appl. No.: 16/543,953

(22) Filed: Aug. 19, 2019

(65) Prior Publication Data
US 2021/0053506 A1 Feb. 25, 2021

(51) Int. Cl.
*B60R 11/06* (2006.01)
*B60R 11/00* (2006.01)

(52) U.S. Cl.
CPC ......... *B60R 11/06* (2013.01); *B60R 2011/004* (2013.01)

(58) Field of Classification Search
CPC ....................................................... B60R 11/06
USPC ......................................... 224/404; 296/37.6
See application file for complete search history.

(56) References Cited

U.S. PATENT DOCUMENTS

| | | | | |
|---|---|---|---|---|
| 2,777,625 | A * | 1/1957 | Kronhaus | B60R 9/06 224/498 |
| 4,106,626 | A * | 8/1978 | Trubiano | B65D 7/26 206/513 |
| 4,522,326 | A * | 6/1985 | Tuohy, III | B60R 11/06 224/310 |
| 4,531,774 | A * | 7/1985 | Whatley | B60R 11/06 224/404 |
| 4,580,803 | A * | 4/1986 | Davis | A61G 5/10 224/407 |
| 4,946,215 | A * | 8/1990 | Taylor | B60R 9/00 224/404 |
| 5,040,843 | A * | 8/1991 | Russell | B60J 7/068 160/133 |
| 5,088,626 | A * | 2/1992 | Patton | A47F 1/08 222/132 |
| 5,088,636 | A * | 2/1992 | Barajas | B60R 11/06 224/281 |
| 5,605,264 | A | 2/1997 | Neal | |
| 5,924,616 | A * | 7/1999 | Shives | B60R 11/06 224/404 |
| 5,992,719 | A | 11/1999 | Carter, III | |
| 6,116,673 | A | 9/2000 | Clonan | |
| 6,264,083 | B1 * | 7/2001 | Pavlick | B60R 9/00 224/281 |
| 6,276,735 | B1 | 8/2001 | Champion | |

(Continued)

*Primary Examiner* — Nathan J Newhouse
*Assistant Examiner* — Lester L Vanterpool
(74) *Attorney, Agent, or Firm* — The Dobrusin Law Firm, P.C.

(57) ABSTRACT

The teachings generally provide for a toolbox system comprising a toolbox that includes an upper surface, a lower surface; and one or more sliding assemblies connected to the toolbox at a location proximate to or on the lower surface so that when the one or more sliding assemblies are connected to a bed of a vehicle the lower surface of the toolbox is suspended above a horizontal plane of a top surface of bed walls of the bed. The sliding assembly of the toolbox is adapted to permit movement of the tool box along the horizontal plane so that the tool box is movable between a fore position and an aft position of the bed of the vehicle.

18 Claims, 9 Drawing Sheets

(56) References Cited

U.S. PATENT DOCUMENTS

| | | | | |
|---|---|---|---|---|
| 6,308,874 B1* | 10/2001 | Kim | | B60R 9/042 224/309 |
| 6,338,427 B1* | 1/2002 | Aftanas | | B60R 9/042 224/309 |
| 6,425,508 B1* | 7/2002 | Cole | | B60R 9/045 224/320 |
| 6,464,277 B2* | 10/2002 | Wilding | | B60R 9/00 224/404 |
| 6,634,691 B2 | 10/2003 | Henderson | | |
| 6,739,487 B2* | 5/2004 | Chimenti | | B60R 9/045 224/315 |
| 6,755,332 B2* | 6/2004 | Crane | | B60R 9/00 224/321 |
| 6,945,580 B1* | 9/2005 | Hentes | | B60R 9/00 224/404 |
| 7,128,356 B2* | 10/2006 | Bassett | | B60R 11/06 296/37.6 |
| 7,316,339 B2* | 1/2008 | Zhang | | B60R 9/06 224/42.34 |
| 7,604,282 B2* | 10/2009 | Spencer | | B60J 7/085 296/100.15 |
| 7,887,114 B2* | 2/2011 | Spencer | | B60R 11/06 296/100.02 |
| 8,256,820 B2 | 9/2012 | Spencer | | |
| 8,640,933 B1* | 2/2014 | McCray | | B60R 9/042 224/310 |
| 9,499,106 B2* | 11/2016 | Reed, III | | B60R 11/06 |
| 9,902,498 B2* | 2/2018 | Gensch | | B60N 2/01575 |
| 11,034,263 B2* | 6/2021 | Gross | | B60N 2/0732 |
| 2002/0057001 A1* | 5/2002 | Wilding | | B60R 9/00 296/37.6 |
| 2002/0070255 A1* | 6/2002 | Hebert | | B60R 9/06 224/401 |
| 2003/0052145 A1* | 3/2003 | Aftanas | | B60R 9/042 224/310 |
| 2003/0201288 A1* | 10/2003 | Ford | | B60R 3/005 224/310 |
| 2004/0188478 A1* | 9/2004 | Williams | | B60R 9/042 224/310 |
| 2005/0121931 A1* | 6/2005 | Waye | | B60R 9/00 296/37.6 |
| 2006/0102669 A1* | 5/2006 | Fouts | | B60R 9/00 224/404 |
| 2006/0244279 A1 | 11/2006 | Ranka et al. | | |
| 2006/0284437 A1* | 12/2006 | Collins | | B60R 9/00 296/37.6 |
| 2007/0102949 A1* | 5/2007 | Andrews | | B60R 9/00 296/37.6 |
| 2008/0197234 A1* | 8/2008 | Wilhelm | | B64C 1/20 244/118.6 |
| 2010/0320732 A1* | 12/2010 | Dobrachinski | | B62B 3/02 280/651 |
| 2011/0042990 A1* | 2/2011 | Holt | | B60P 7/0815 296/37.6 |
| 2016/0046241 A1* | 2/2016 | Crismon | | B60J 7/102 224/326 |
| 2016/0167591 A1* | 6/2016 | Salinas | | B60R 11/06 224/404 |
| 2016/0311377 A1* | 10/2016 | Aftanas | | H02S 20/30 |
| 2018/0312115 A1* | 11/2018 | Reed | | B62D 35/00 |
| 2018/0361838 A1* | 12/2018 | Spencer | | B60J 7/198 |

* cited by examiner

TOP MOUNT TOOLBOX SYSTEM

FIELD

The present teachings generally relate to a system including a movable toolbox mounted above the bed of a vehicle that couples with a tonneau cover.

BACKGROUND

Typically, vehicle toolboxes are stationary and located at the fore position of a vehicle bed. If the toolbox is used with a tonneau cover, the tonneau cover extends from the tailgate up to the toolbox.

In some cases, vehicle toolboxes in the marketplace can slide fore and aft within the bed of a vehicle. However, slidable toolboxes are typically located at or below the tonneau cover, preventing the toolbox from moving when the tonneau cover is extending across the vehicle bed or not permitting a tonneau cover to be installed. Further, in order to move the toolbox, contents within the bed need to be moved to facilitate lineal movement of the toolbox along the length of the bed.

What is needed is a toolbox system which can be moved between the front and rear of a vehicle bed without moving the cargo located in the bed. What is needed is a toolbox system that can be adapted to the length and width of different models of vehicles. What is needed is a toolbox system that can be used with a tonneau cover and remain movable when the tonneau cover is closed, covering the vehicle bed.

SUMMARY

The present teachings meet one or more of the present needs by providing a toolbox positioned above a tonneau cover so that the toolbox is free to be slid fore and aft when a tonneau cover is in closed position. The toolbox is slidably mounted to bed rails that are positioned above a top horizontal surface of a truck bed. The tonneau cover is positioned at or below the top horizontal surface of the truck bed so that the toolbox may be moved without interference.

The present teachings meet one or more of the present needs by providing: a toolbox system comprising: a toolbox that includes: an upper surface, a lower surface; one or more sliding assemblies connected to the toolbox at a location proximate to or on the lower surface so that when the one or more sliding assemblies are connected to a bed of a vehicle the lower surface of the toolbox is suspended above a horizontal plane of a top surface of bed walls of the bed; wherein the sliding assembly of the toolbox is adapted to permit movement of the tool box along the horizontal plane so that the tool box is movable between a fore position and an aft position of the bed of the vehicle.

Another possible embodiment of the present teachings comprises: a toolbox system comprising: a) a toolbox; b) one or more mounting plates; and c) one or more sliding assemblies; wherein the toolbox is connected to the one or more mounting plates, and the one or more mounting plates are connected to the one or more sliding assemblies; wherein the one or more sliding assemblies are adapted to be received within the one or more bed rails located on a top surface of bed walls of a bed of a vehicle, such that the toolbox is configured to move between a fore position and an after position along the bed rails.

The teachings herein provide: a system comprising: a sliding toolbox assembly: a pair of bed rails; and a sliding assembly; a tonneau cover assembly including: a tonneau cover with an open position and a closed position; and tonneau cover rails; wherein the toolbox is slidably connected with the pair of bed rails by the sliding assembly; wherein the tonneau cover rails attach to the bed rails such that the tonneau cover in the closed position is located at or below a horizontal plane of a top surface of a bed of a vehicle; wherein the toolbox is positioned at or above the horizontal plane of the top surface of the bed and is movable between a fore position and an aft position over the tonneau cover in the closed position.

DETAILED DESCRIPTION

The explanations and illustrations presented herein are intended to acquaint others skilled in the art with the teachings, its principles, and its practical application. Those skilled in the art may adapt and apply the teachings in its numerous forms, as may be best suited to the requirements of a particular use. Accordingly, the specific embodiments of the present teachings as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The present teachings generally relate to a toolbox system. The toolbox system may function to enable a toolbox to move along the length of a vehicle bed. The toolbox system may include a toolbox, one or more reinforcements, one or more mounting plates, one or more sliding assemblies, one or more attachment assemblies, one or more bed rails, one or more tonneau cover rails, or a combination thereof. The toolbox system may be adapted to connect with the walls of a bed of a vehicle. The toolbox system may be adapted to be used in conjunction with a tonneau cover. The toolbox system may be adapted to slide along the length of the bed of the vehicle to and from a fore and an aft position. The toolbox system may be used in conjunction with or without a tonneau cover. The toolbox system may be adapted to slide over a horizontal plane formed by the top surface of the vehicle bed.

The toolbox system is configured to be used with the bed of a vehicle. The vehicle bed may have at least two spaced apart walls extending upwards from a bed floor. The at least two spaced apart walls may be longitudinal bed walls. The longitudinal bed walls are located on opposite sides of the bed floor creating an open space between the two longitudinal walls. The vehicle bed may also include an end wall and a tailgate that extend upwards from the bed floor opposite each other between the two walls. The top surface of the bed walls and tailgate form a horizontal plane above the open area. The toolbox system may be adapted to connected with the top surface of the bed walls and position a toolbox substantially above the horizontal plane.

The toolbox system may include a toolbox. The toolbox may function to store, carry, protect, transport, or a combination thereof. The toolbox may extend from one longitudinal bed wall to another longitudinal bed wall. The toolbox may include a top portion with an upper surface, a bottom portion with a lower surface, and sidewalls. The toolbox may be a tool basket. The tool basket may be foldable. For example, the tool basket may have a first position where the basket is horizontal and a second position where the basket is vertical. The toolbox may include a cavity which is defined by the top portion, bottom portion, and sidewalls. The toolbox may include a lid to access the cavity. The toolbox lid may be locked and unlocked by a toolbox lock. The toolbox may include one or more reinforcements.

The toolbox may be a tool basket. The tool basket may include a plurality of walls, a floor, a plurality of wall clips, a lifting device, one or more basket locks, one or more basket mounts, or a combination thereof. The tool basket may be foldable. The plurality of walls of the basket to be folded in towards the basket floor. The plurality of side walls may function to define an open cavity between the basket floor and the perimeter of the basket. The plurality of basket walls may be foldable. The plurality of basket walls may be hinged to the basket floor. The basket walls may be connected together with one or more wall clips when the basket walls are extended to form the cavity of the basket. The basket floor may be a hinged connection with the one or more basket mounts so that the basket may further fold from a horizontal position to a vertical position allowing for additional space on the vehicle bed. For example, the basket may be horizontal and open to receive items, and then the basket walls may be folded inwards towards the basket floor. The basket may then subsequently be folded up from the horizontal position to the vertical position where the basket may be stored. The basket may be in lockable connection with one or more bed rails, one or more mounting plates, one or more reinforcements, or a combination thereof when the basket is in the horizontal position.

The tool basket may include one or more basket locks. The one or more basket locks may function to create a lockable connection with the one or more bed rails, the one or more one or more mounting plates, the one or more reinforcements, or a combination thereof when the basket is in the horizontal position. The tool basket may include one or more, two or more, three or more, four or more, or even a plurality of basket locks. The one or more basket locks may be any device that can be selectively locked and unlocked. The one or more basket locks may be a slide bolt, a cam lock, a key lock, a latch, a biasing lock, or a combination thereof. For example, the one or more basket locks may be a slide bolt lock that is connected to the basket floor. The one or more basket locks may be configured to removably connected with the one or more bed rails, the one or more one or more mounting plates, the one or more reinforcements, or a combination thereof. For example, the one or more basket locks are slide bolt locks, and when the basket is in the horizontal position, the one or more slide bolts engage the one or more mounting plates so that the basket is unable to be lifted into the vertical position without unlocking the slide bolt locks. The one or more basket locks may include a spring mechanism to facilitate a quick engagement between the one or more basket locks and the one or more bed rails, the one or more one or more mounting plates, the one or more reinforcements, or a combination thereof.

The basket may include one or more basket mounts. The one or more basket mounts may function to connect the basket with the one or more reinforcements, the one or more mounting plates, the one or more rails, the vehicle bed, the one or more sliding assemblies, or a combination thereof. The basket may include one or more, two or more, three or more, or even a plurality of basket mounts. The one or more basket mounts may be a planar piece that connects to the one or more mounting plates, the one or more bed rails, the one or more reinforcements, the one or more sliding assemblies, or a combination thereof. The one or more basket mounts may extend fully or partially across the one or more mounting plates, the one or more bed rails, the one or more reinforcements, or a combination thereof. The one or more basket mounts may be made of plastic, steel, composite, or a combination thereof. The one or more basket mounts may be attached with the basket through a hinged connection. The one or more basket mounts may function to help convert the basket from a horizontal position to a vertical position. The one or more basket mounts may be connected with a lifting device that assists in holding the basket in the vertical position, the horizontal position, or both.

The toolbox system may include one or more reinforcements. The one or more reinforcements may be connected with the lower surface of the toolbox. The one or more reinforcements may be connected with one or more basket mounts. The one or more reinforcements may function to strengthen the lower surface of the toolbox. The one or more basket locks may connect with the one or more reinforcements. The one or more reinforcements may be attached, integrated, disposed within, or combination thereof with the toolbox. The one or more reinforcements may extend across the toolbox, through the toolbox, or both. The one or more reinforcements may extend along a width, a length, diagonally, or a combination thereof of the toolbox. The one or more reinforcements may be located within or integral to a wall of the toolbox. The one or more reinforcements may be located on an external wall of the toolbox. The one or more reinforcements may be the one or more basket mounts. The one or more reinforcements may be any shape. The one or more reinforcements may have a cross-section that is round, square, flat, rectangular, triangular, oval, or a combination thereof. For example, the one or more reinforcements may be one or more reinforcing rods with a round cross-section. In another example, the one or more reinforcements may be a plate spanning the entire lower surface of the toolbox. The one or more reinforcements may be in communication with one or more mounting plates.

The toolbox system may include one or more mounting plates. The one or more mounting plates may be located proximate to the lower surface of the toolbox. The one or more mounting plates may function to connect the toolbox with one or more reinforcements, one or more bed rails, one or more basket mounts, one or more basket locks, a lift device, one or more basket locks, or a combination thereof. The toolbox system may include one or more, two or more, three or more, four or more, or a plurality of mounting plates. The one or more mounting plates may be located proximate to the lower surface of the toolbox. Proximate to the lower surface may mean in direct or indirect contact with the lower surface of the toolbox, immediately adjacent to the lower surface (e.g. on a side of the toolbox), or both. For example, the one or more mounting plates may be attached to the lower surface of the toolbox. In another example, the one or more mounting plates may be connected to the side of the toolbox immediately adjacent to the lower surface of the toolbox. The one or more mounting plates may be the reinforcements. The one or more mounting plates may be the one or more basket mounts. The one or more mounting plates may be located entirely within one plane. The one or more mounting plates may be located within a plurality of planes. The one or more mounting plates may have a first portion in a first plane and a second portion in a second plane that extends at an angle (e.g., about 90 degrees) relative to the first portion. The toolbox system may include one or more, two or more, three or more, four or more, or even a plurality of mounting plates. The one or more mounting plates may be attached proximate to the lower surface of the toolbox by any common means of attachment such as with fasteners, adhesives, or both. For example, the one or more mounting plates may be attached proximate to the lower surface of the toolbox by a plurality of fasteners. The one or more mounting plates may include one or more positioning holes. Each mounting plate may include one or more, two or more, three or more, four or more, or a plurality of positioning holes. The positioning holes on the one or more mounting plates may function to allow the toolbox to be longitudinally and transversely positioned in a desired location depending on the length and width of the vehicle bed. For example, the tool box may be expanded from a first set of positioning holes to a second set of positioning holes to accommodate a width of a vehicle bed that is larger or smaller than an average vehicle bed width. The one or more positioning holes on the one or more mounting plates may be configured to connect with the one or more sliding assemblies.

The toolbox system may include one or more sliding assemblies. The one or more sliding assemblies may function to attach the toolbox system to a vehicle bed. The one or more sliding assemblies may be connected to the toolbox at a location proximate to or on the lower surface. Proximate to the lower surface may mean in direct or indirect contact with the lower surface of the toolbox, the one or more mounting plates, or both, immediately adjacent to the lower surface of the toolbox, the one or more mounting plates, or both (e.g. on a side of the toolbox or one or more mounting plates). The one or more sliding assemblies may be disposed partially through the one or more positioning holes located on the one or more mounting plates, the one or more basket mounts, or both. The one or more sliding assemblies may have a locked position and an unlocked position. When the one or more sliding assemblies are in the unlocked position, the one or more sliding assemblies may allow the mounting plates to be positioned or repositioned longitudinally and transversely relative to the bed rails. When the one or more sliding assemblies are in the locked position, the mounting plates may be secured in a selected position and unable to move. The one or more sliding assemblies may include one or more sliding elements, one or more locking elements, one or more fasteners, one or more quick-release connectors, or a combination thereof. The toolbox system may include one or more, two or more, three or more, four or more, or a plurality of sliding assemblies. For example, the toolbox system may have a first sliding assembly on a left side of the toolbox and a second sliding assembly on the right side of the toolbox. In another example, the toolbox system may have two sliding assemblies on a left side of the toolbox and two sliding assemblies on a right side of the toolbox. The one or more sliding assemblies may be adapted to move along the one or more bed rails. The one or more sliding assemblies may include one or more sliding elements, one or more locking elements, one or more fasteners, one or more quick-release connectors, a portion of the one or more bed rails, a portion of the one or more mounting plates, a portion of the one or more basket mounts, or a combination thereof.

The one or more sliding assemblies may include one or more sliding elements. The one or more sliding elements may function to move over, on, within, or a combination thereof a bed rail. Each sliding assembly may have one or more, two or more, three or more, four or more, or a plurality of sliding elements. The one or more sliding elements may accept the one or more fasteners. The one or more sliding elements may be directly or indirectly in communication with the lower surface of the mounting plate, the top surface of the bed rail, or both. The one or more sliding elements may be made of steel, plastic, a polymer, poly, composite material, or any suitable material capable of moving along a bed rail with minimal friction. For example, the one or more sliding elements may be a low friction pad. The sliding elements may have a coating. The coating may be a low friction coating such as polytetrafluoroethylene, graphite, graphene, an aluminum anodizer, or a combination thereof. The one or more sliding elements may directly or indirectly contact the bed rail, the mounting plate, or both. The one or more sliding elements may be configured to ride over or on the bed rail so that the toolbox can be moved from position to position. The one or more sliding elements may be locked in a desired position.

The sliding assembly may include one or more locking elements. The one or more locking elements may function to assist in locking the toolbox system in a desired location. Each sliding assembly may have one or more, two or more, three or more, four or more, or a plurality of locking elements. The one or more locking elements may be configured to accept the one or more fasteners. The one or more locking elements may be a washer, block, spacer, lug, nut, t-bolt, a threaded member, a set screw, cotter pin, clip, contact with the bed rail, a detent, or a combination thereof. The one or more locking elements may be made of plastic, steel, a composite material, or a combination thereof. The one or more locking elements may vary in size and shape. The one or more locking elements may be integrated with the one or more fasteners. The one or more locking elements may be separate from the one or more fasteners. The one or more locking elements may be in communication with a portion of the bed rail. The one or more locking elements may be movable when not engaged with a fastener. The one or more locking elements may be static, immovable, or both when the sliding assembly is in the locked position. The one or more locking elements may be movable along a track but be locked within the track. The one or more locking elements may assist in locking the one or more sliding assemblies to the one or more mounting plates and the one or more bed rails.

The one or more sliding assemblies may include one or more fasteners. The one or more fasteners may be any fastener suitable to be disposed through the one or more sliding elements, one or more locking elements, the one or more quick-release connectors, or a combination thereof. Each sliding assembly may have one or more, two or more, three or more, four or more, or a plurality of fasteners. The one or more fasteners may be any fastener capable of interacting with the one or more locking elements, the one or more sliding elements, and the one or more quick-release connectors. The one or more fasteners may be made of plastic, steel, composite material, or a combination thereof. The one or more fasteners may be a threaded member, a pin, screw, bolt, rivet, carriage bolt, dowel, keeper, pin, t-bolt, stud, or a combination thereof. The one or more fasteners may be integrated with the one more locking elements. For example, the one or more fasteners may be a t-bolt. The one or more fasteners may engage with one or more quick-release connectors.

The one or more sliding assemblies may include one or more quick-release connector. The one or more quick-release connectors may function to assist in locking and unlocking the sliding assembly. The one or more sliding assemblies may include one or more, two or more, three or more, four or more, or a plurality of quick-release connectors. The quick-release connector may be made of plastic, steel, a composite material, or a combination thereof. The one or more quick-release connectors may be any connector that can be engaged and disengaged without the need for tools (e.g. hand tighten/loosen). The one or more quick-release connectors may be a thumb nut, a wing nut, a hex nut, a cap nut, a flanged nut, a slotted nut, a castle nut, a square nut, a castle nut, or a combination thereof. The one or more quick-release connectors may include one or more plastic components that are expanded so that a user may grip and turn the quick-release connectors or have leverage to move the quick-release connectors. The one or more quick-release connectors may be engaged and disengaged with the one or more fasteners, locking and unlocking the toolbox system.

The quick-release connector may engage the fastener to sandwich the sliding assembly components together, subsequently locking the toolbox in a desired position. In one example, when the sliding assembly is locked, the locking element may be moved into contact with the channel protrusions and the sliding element may be sandwiched between the top surface of the bed rail and the mounting plate. In another example, when the sliding assembly is locked, the locking element may be moved into contact with a bottom portion of the channel such that the sliding assembly is prevented from moving. When the sliding assembly is unlocked, the quick-release connector may partially disengage the locking element from the channel protrusions, releasing the tension between the components of the sliding assembly so that the mounting plate can be moved and positioned.

The one or more sliding assemblies may be connected with one or more bed rails. The one or more bed rails may function to allow the one or more sliding assemblies to move to and from the fore and aft position of the vehicle bed. The toolbox system may include one or more, two or more, three or more, four or more, or a plurality of bed rails. The bed rails may be located on and attached with the top surface of the bed walls, tailgate, or both. For example, bed rails are attached to the longitudinal bed walls, extending the entire length of the vehicle bed. The basket locks may connect with and engage the one or more bed rails when the basket is in the horizontal position. The bed rails may be made of steel, plastic, composite material, or a combination thereof. Each of the one or more bed rails may include a channel. The channel may have a c-shape, t-shape, z-shape, or any shape including one or more channel protrusions which may be configured to engage with the one or more locking elements. The one or more channel protrusions may be any protrusion which extends perpendicularly from a side of the channel toward the center of the channel so that the fastener may still travel along the length of the bed rail while retaining the one or more locking elements within the channel.

The one or more bed rails may include one or more attachment arms. The one or more attachment arms may function to connect with one or more accessory components. The one or more attachment arms may extend from a surface of the one or more bed rails into the bed of the vehicle so that the one or more accessory components are located at or below the horizontal plane of the top surface the vehicle bed. The one or more attachment arms may include a plurality of mounting ridges to assist in attaching the one or more accessory components.

The one or more bed rails may be configured to connect with one or more accessory components. The one or more accessory components may be one or more tonneau cover rails. The one or more tonneau cover rails may function to attach with the bed rail and carry a tonneau cover. The one or more tonneau cover rails may position a tonneau cover at or below the horizontal plane of the top surface of the vehicle bed. Because the tonneau cover is at or below the horizontal plane, the sliding toolbox assembly may slide to and from the fore position and the aft position over the tonneau cover.

Figure 1A:
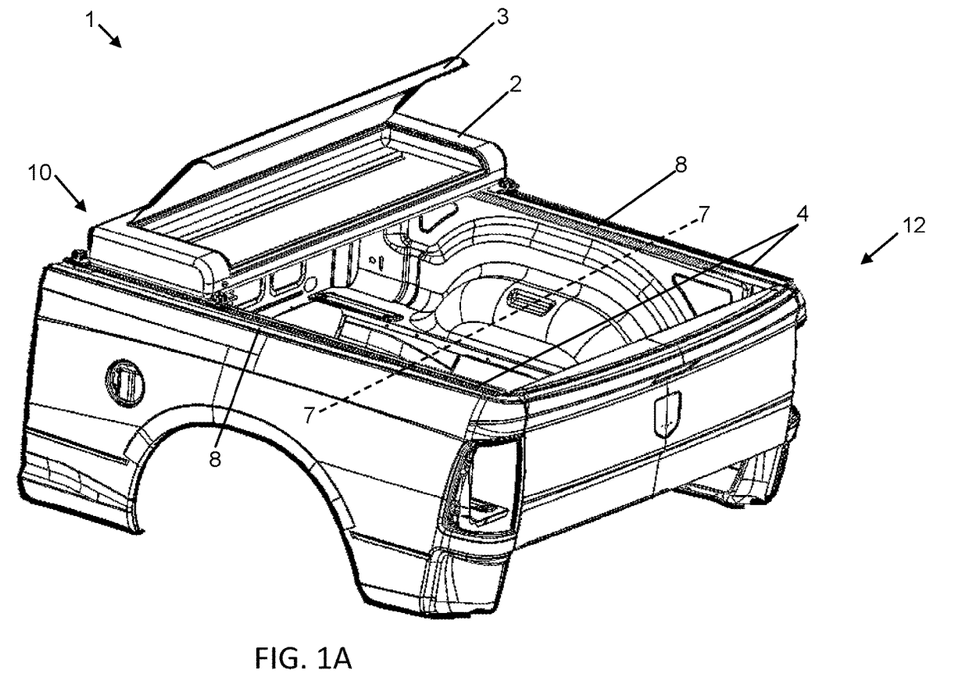
FIG. 1A is a perspective view of a toolbox in the fore position.
Figure 1B:
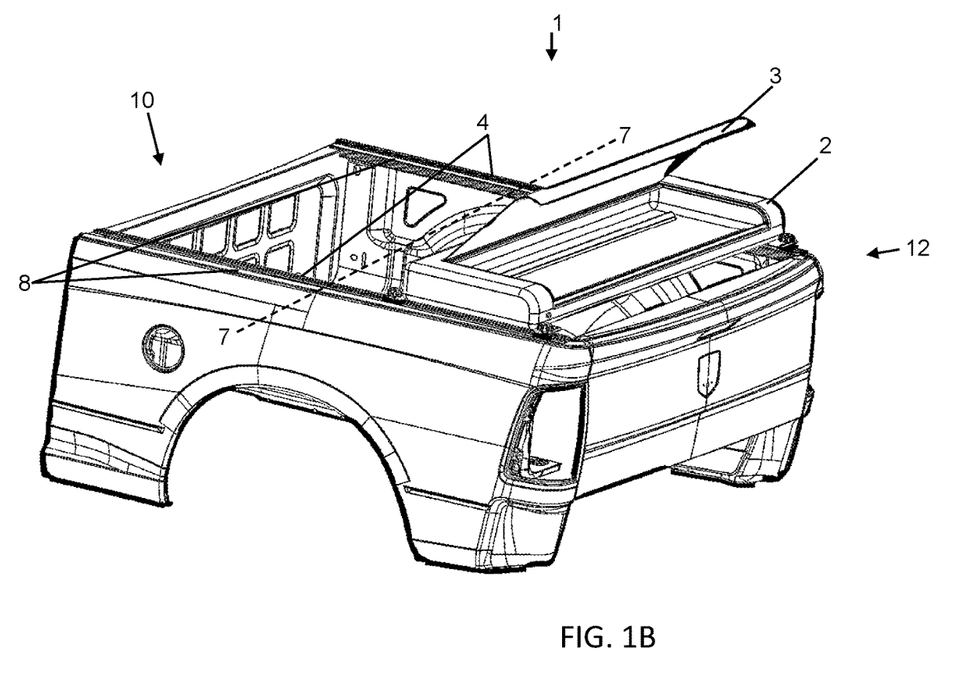
FIG. 1B is a perspective view of a toolbox in the aft position.

FIGS. 1A and 1B illustrate a perspective view of a sliding toolbox assembly 1. In FIG. 1A, the sliding toolbox assembly 1 is in the fore position 10. In FIG. 1B the sliding toolbox assembly is in the aft position 12. The sliding toolbox assembly 1 includes a toolbox 2 with a lid 3 and bed rails 4. The toolbox 2 attaches to the bed rails 4 with the sliding assembly 20. The toolbox is connected to the mounting plate 14. The mounting plate 14 connects with the sliding assembly 20. The sliding assembly 20 moves between the fore position 10 and aft position 12 along the bed rails 4. The bed rails connect with the top surface 8 of the truck bed walls 6.

Figure 2:
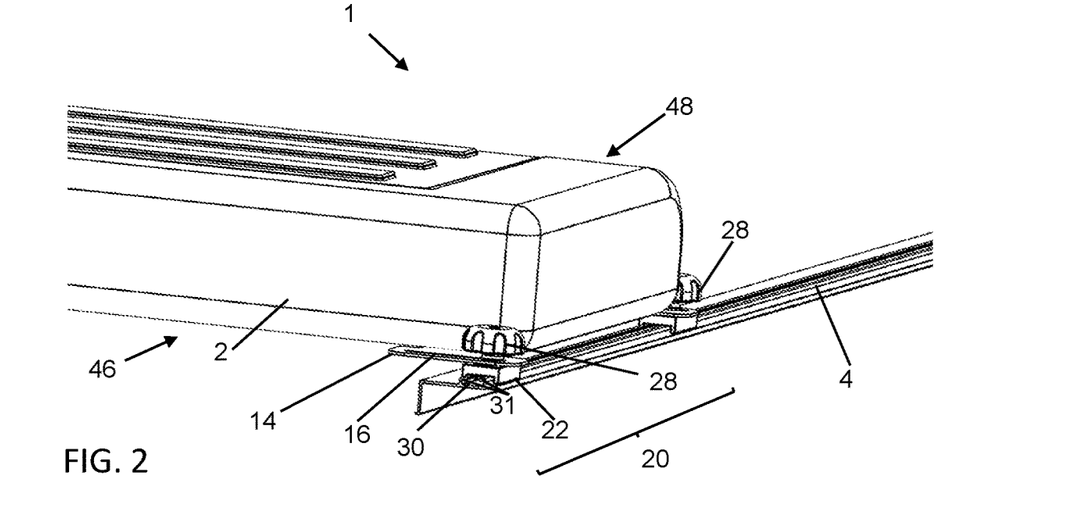
FIG. 2 is a partial view of the toolbox and rail.

FIG. 2 shows a perspective view of the sliding toolbox assembly 1 connected with the bed rail 4. The bed rail 4 includes a channel 30 with channel protrusions 31. The toolbox 2 is attached to the mounting plate 14 proximate to the lower surface 46. The mounting plate 14 is connected to the bed rail 4 through the sliding assembly 20. The quick-release connector 28 attaches to a fastener 26 through the mounting plate 14. The fastener 26 is disposed through a sliding element 22, which rides over the bed rail 4, and a locking element 24, which is located within the channel 30 of the bed rails 4. In this view, the locking element 24 is not visible.

Figure 3:
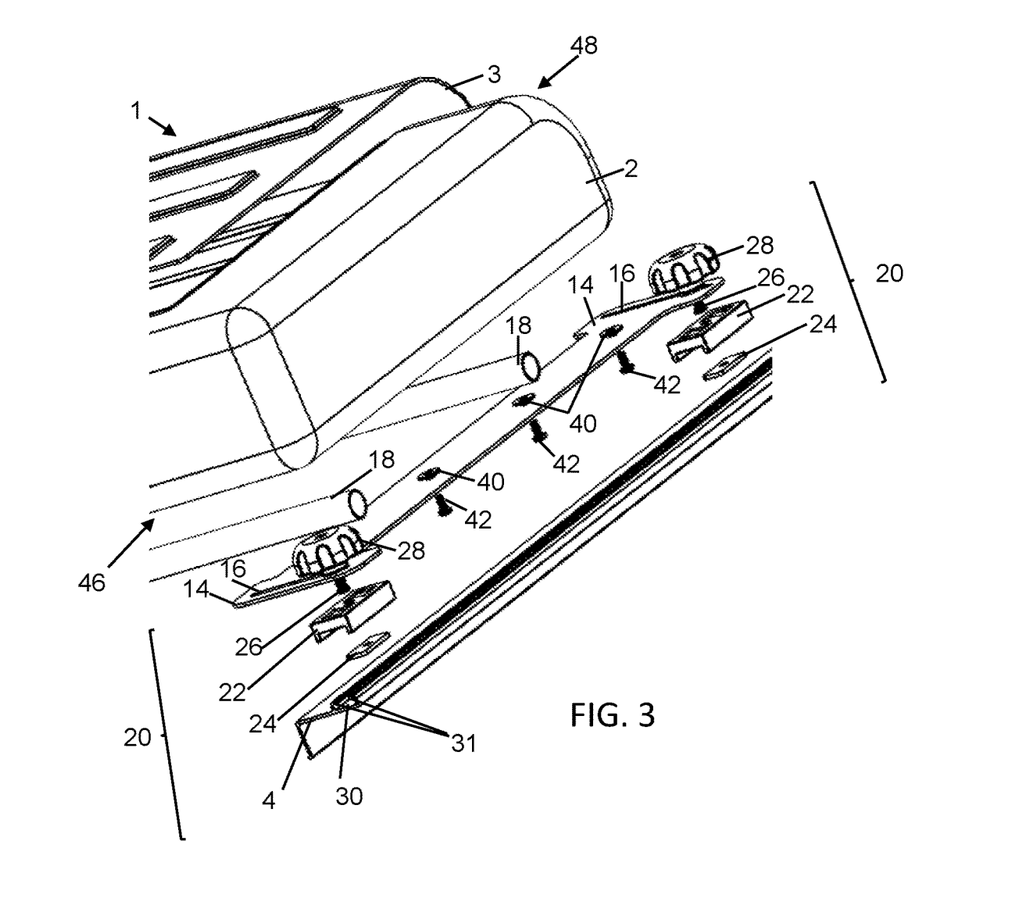
FIG. 3 is an exploded view of the toolbox and bed rail.

FIG. 3 shows an exploded view of the sliding toolbox system 1. The toolbox 2 includes a lid 3 proximate to the top surface 48 and reinforcements 18. The reinforcements are sandwiched between the toolbox 2 and the mounting plate 14 when the toolbox is attached to the mounting plate 14 proximate to the lower surface 46. The toolbox 2 attaches to the mounting plate 14 with a plurality of fasteners 42 disposed through mounting holes 40 into the toolbox. The mounting plate 14 also includes positioning holes 16 which the tee bolts 26 are disposed through. The positioning holes 16 allow the sliding toolbox system 1 to be adapted to different width truck beds. The lock connector 26 passes through the locking element 24 and the sliding element 22 through the mounting plate 14 to the quick-release connector 28. When the sliding toolbox system 1 is assembled, the locking element 24 and the sliding element 22 sandwich the channel 30 of the bed rail 4. The locking element 24 rides within the channel 30 and the sliding element 22 rides over the channel 30. When the quick-release connector 28 is tightened, the sliding element 22 and the locking element 24 are brought closer together, increasing the tension on the channel protrusions 31, locking the sliding toolbox system 1 in the desired location. When the quick-release connector 28 is loosened, the tension on the channel protrusions 31 is decreased, allowing a user to slide the toolbox 2 to another position.

Figure 4A:
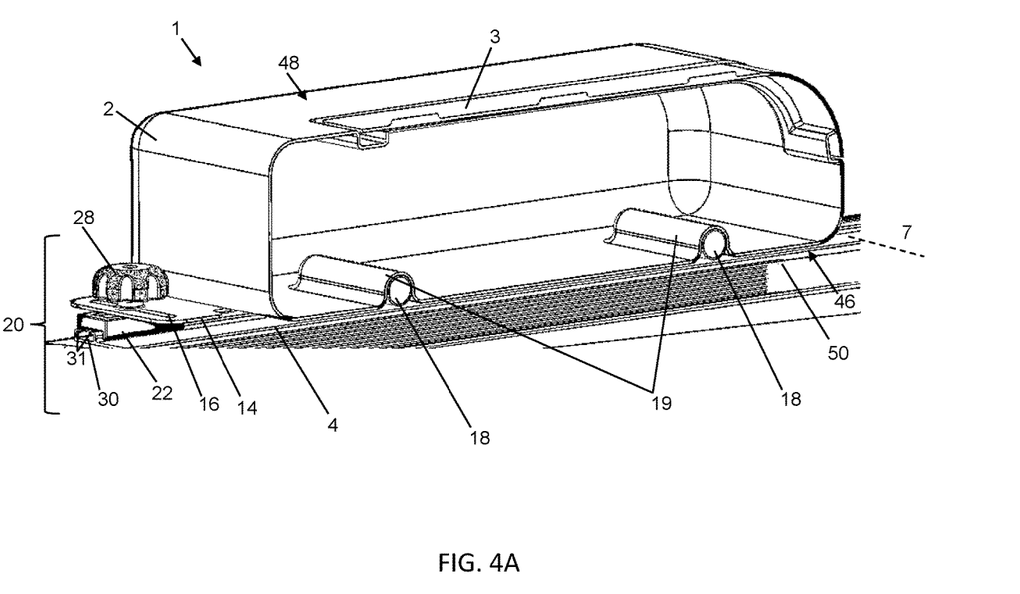
FIG. 4A is a sectional view of a toolbox consistent with the teachings herewith.

FIG. 4A is a cross-sectional view of the toolbox 2 with reinforcements 18. The reinforcements 18 are located between the mounting plate 14 and the toolbox 2 proximate to the lower surface 46 for providing additional support to the toolbox. The reinforcements 18 are located in reinforcement holders 19 which extend into the toolbox. The sliding assembly 20 can be seen in this view attached with the bed rail 4. The bed rail 4 located on the top surface 8 of the vehicle bed wall 6 so that the toolbox 2 is positioned over the horizontal plane 7 of the vehicle bed and adapted to enable the toolbox 2 to slide between positions when a tonneau cover is used.

Figure 4B:
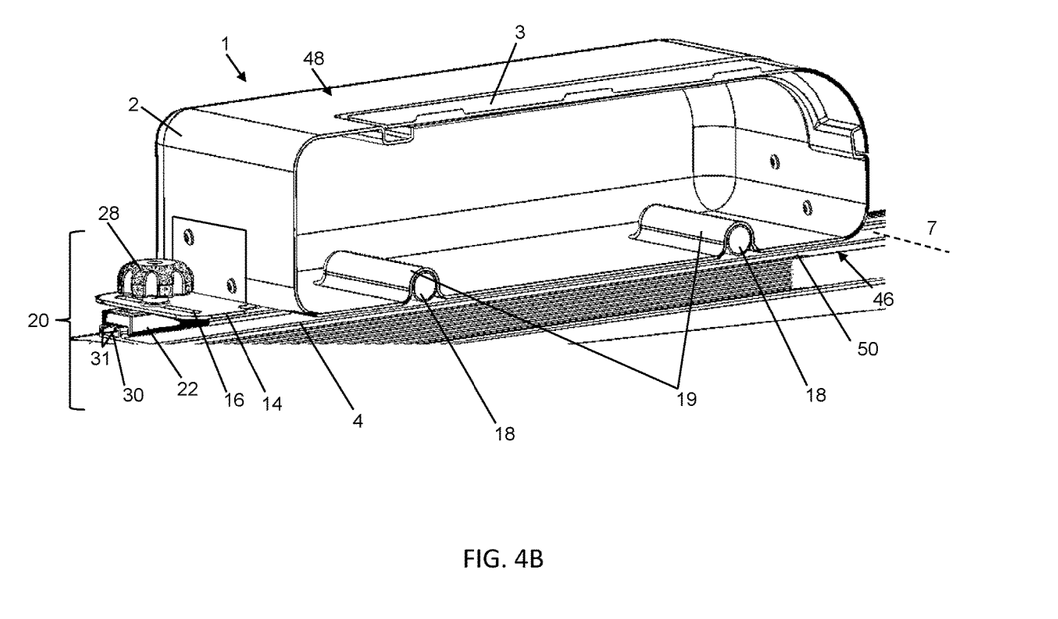
FIG. 4B is a sectional view of a toolbox consistent with the teachings herewith.

FIG. 4B is a cross-sectional view of the toolbox 2 with reinforcement tubes 18 and mounting plates 14 proximal to the lower surface 46 of the toolbox 2. In this example, the mounting plates 14 are connected to a portion of the toolbox proximate to the lower surface 46. The reinforcements 18 are located in reinforcement holders 19 which extend into the toolbox. The sliding assembly 20 can be seen in this view attached with the bed rail 4. The bed rail located on the top surface 8 of the vehicle bed wall 6 so that the toolbox 2 is positioned over the horizontal plane 7 of the vehicle bed and adapted to enable the toolbox 2 to slide between positions when a tonneau cover is used.

Figure 4C:
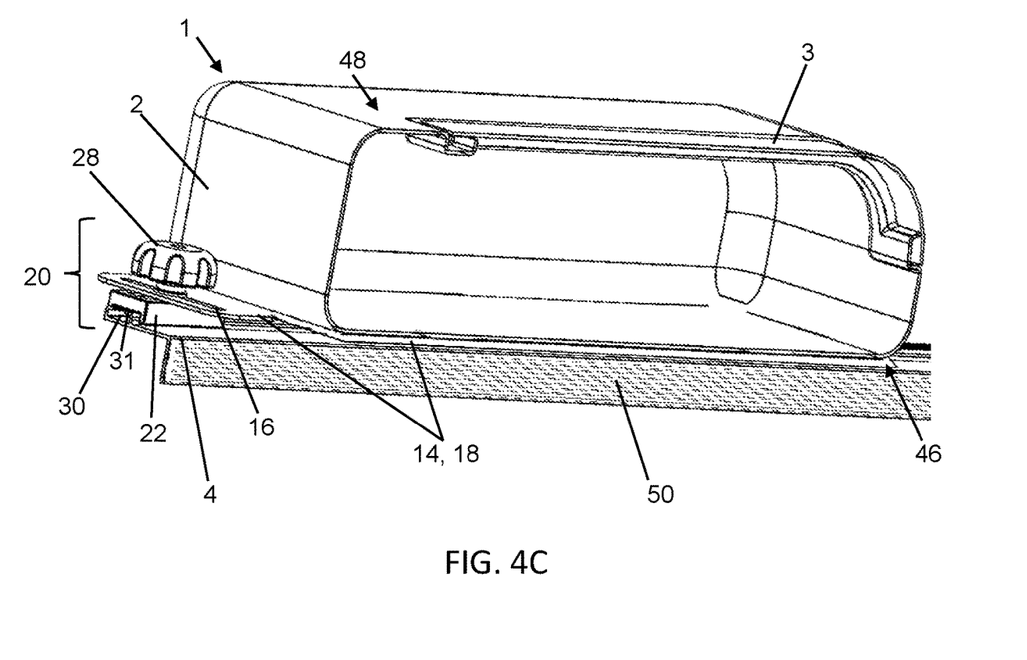
FIG. 4C is a sectional view of a toolbox consistent with the teachings herewith.

FIG. 4C is a cross-sectional view of the toolbox 2 with mounting plate 14 as the reinforcement 18 of the toolbox 2. The mounting plate 14 spans the entire length and width of the toolbox 2. The sliding assembly 20 can be seen in this view attached with the bed rail 4. The bed rail located on the top surface 8 of the vehicle bed wall 6 so that the toolbox 2 is positioned over the horizontal plane of the vehicle bed and adapted to enable the toolbox 2 to slide between positions when a tonneau cover is used.

Figure 5A:
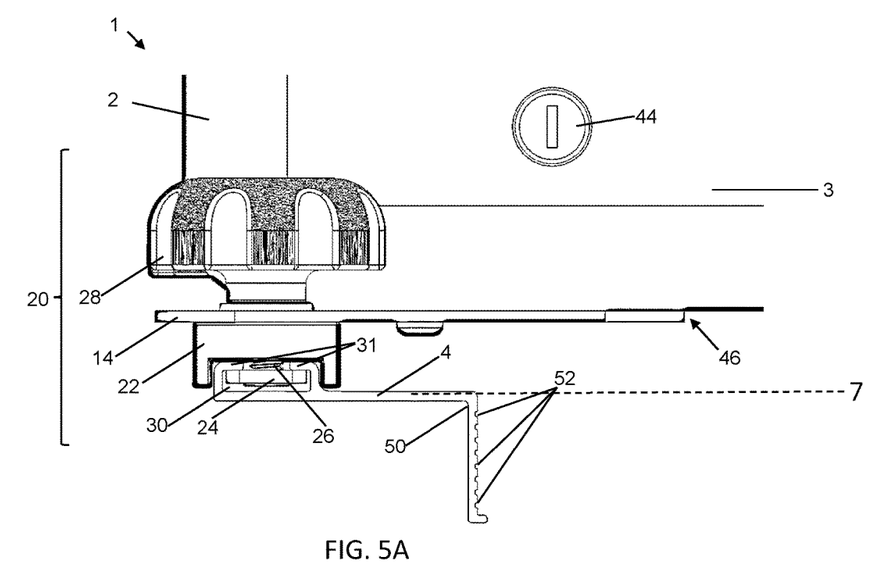
FIG. 5A is an end view of the sliding toolbox and bed rail without a tonneau cover rail.

FIG. 5A is an end view of the sliding toolbox system 1. The toolbox 2 includes a lid lock 44 for locking the toolbox lid 3. The sliding toolbox system 1 is assembled showing the sliding assembly 20 around the channel 30 of bed rail 4. As can be seen in this view, the locking element 24 is within the channel 30, and the sliding element 22 rides on top of and around the channel 30. The fastener 26 is disposed through the locking element 24, the sliding element 22, the channel 30, the mounting plate 14 into the quick-release connector 28. The bed rail 4 includes a mounting arm 50 which may be used to attach a tonneau attachment rail. The mounting arm 50 includes a plurality of mounting ridges 52.

Figure 5B:
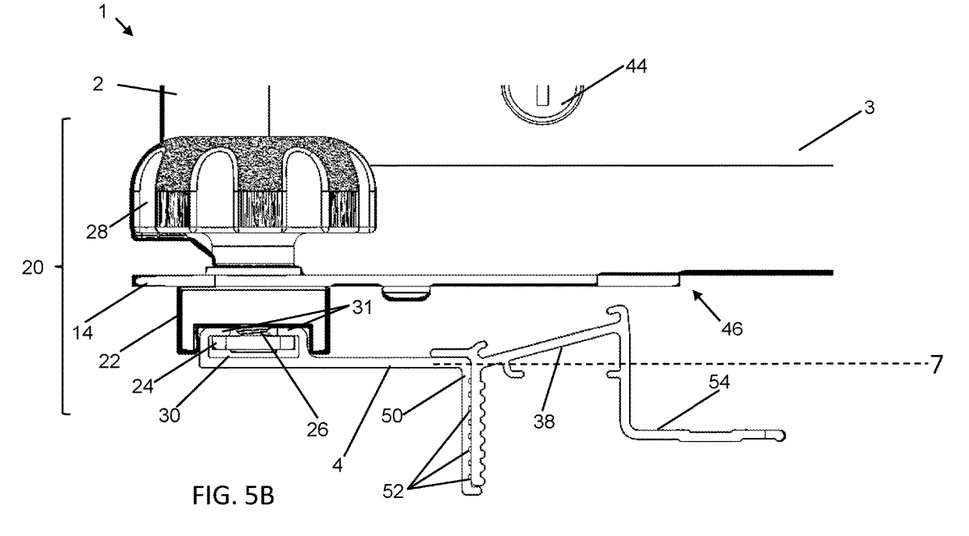
FIG. 5B is an end view of the sliding toolbox and bed rail with a tonneau cover rail.

FIG. 5B is an end view of the sliding toolbox system 1 including a tonneau mounting rail 38. The tonneau mounting rail attaches to the bed rail 4 at the attachment arm 50. The tonneau mounting rail 38 includes a tonneau attachment portion 54. The tonneau attachment portion is located below of the horizontal plane of the top surface of the truck bed so that the sliding toolbox system 1 is capable of sliding over a tonneau cover without having to remove the tonneau cover.

Figure 6:
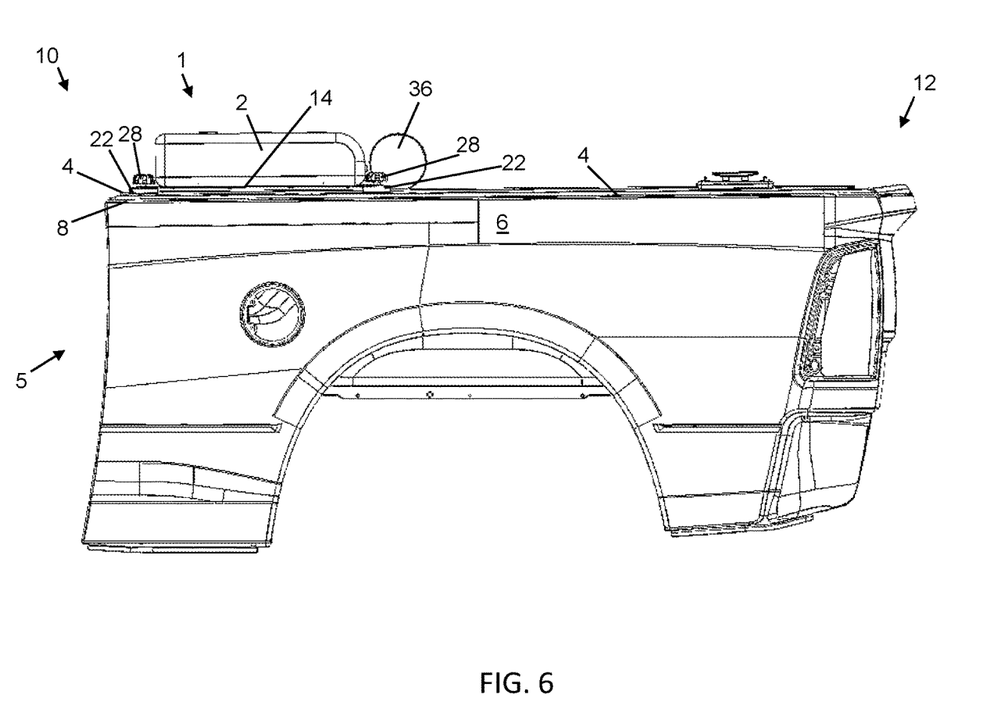
FIG. 6 is a side view of a truck bed incorporating the sliding toolbox and tonneau cover.

FIG. 6 is a side view of a truck bed incorporating the sliding toolbox system 1 and a tonneau cover 36. As can be seen, the tonneau cover 36 is rolled up so that a user may access the bed of the truck 5 and the toolbox 2. The toolbox 2 is in the fore position 10. When the tonneau cover 36 is unrolled and is covering the truck bed 5, the toolbox is capable of being moved from the fore position 10 to the aft position 12. The toolbox moves along rails 4 such that the entire toolbox rides above the horizontal plane of the top surface of the truck bed and the tonneau cover without interference when the tonneau cover is unrolled.

Figure 7A:
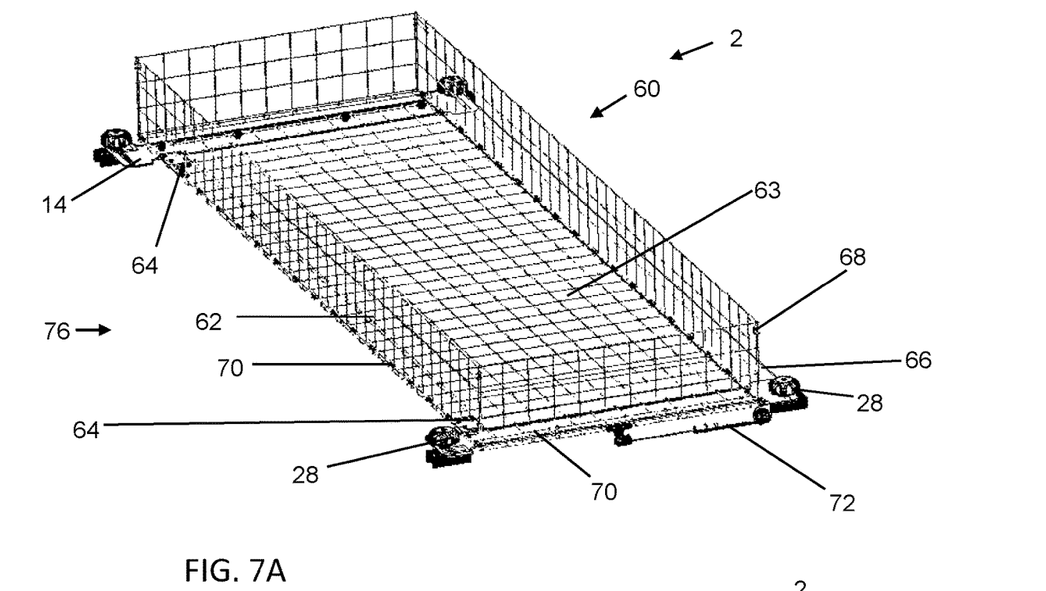
FIG. 7A is a perspective view of the toolbox as a foldable basket in a first basket position.

FIG. 7A is a perspective view of the toolbox 2 as a foldable basket 60 in a first basket position 76 (horizontal position). The basket 60 includes basket walls 62 and basket floor 63. The basket walls 62 are connected to the basket floor 63 by hinges 70. The basket walls are connected with each other with the basket wall clips 68. The basket floor 63 is in a hinged connection with the basket mount 66. Basket mount 66 is connected with mounting plates 14 by a portion of the sliding assembly, which is disposed through both the mounting plates and the basket mount. The quick-release connector 28 of the sliding assembly is shown. The basket floor includes basket locks 64 which connect with mounting plates 14. Lifting device 72 is shown attached to the basket and a mounting plate 14.

Figure 7B:
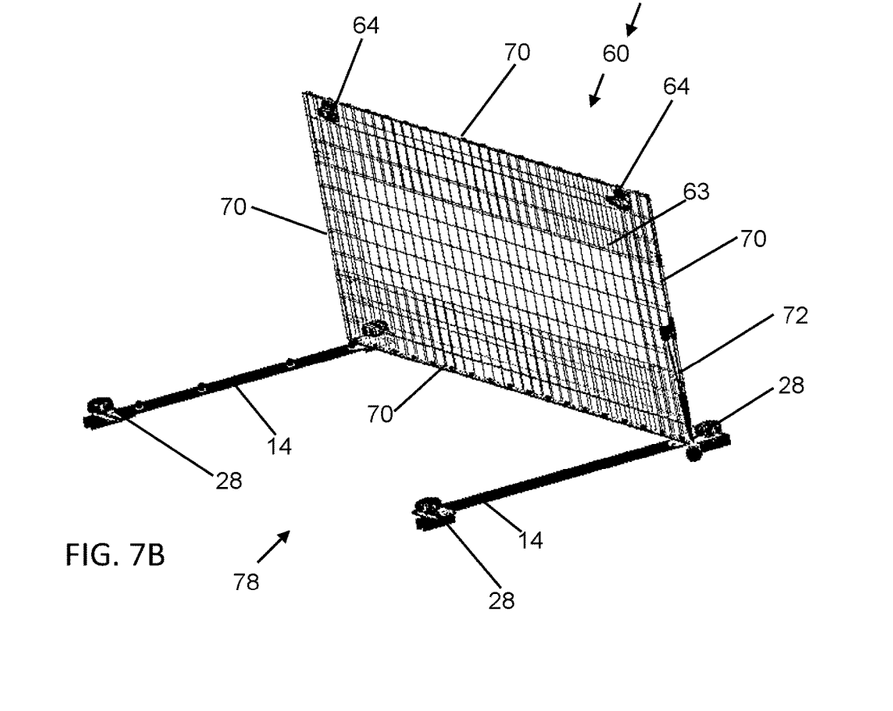
FIG. 7B is a perspective view of the toolbox as a foldable basket in a second basket position.

FIG. 7B is a perspective view of the toolbox 2 as a foldable basket 60 in a second basket position 78 (vertical position). The basket walls 62 are unhooked from the wall clips 68 and folded in towards the basket floor 63. The basket locks 64 are disengaged from the mounting plates 14 and the folded basket is moved into the vertical second position 78 with assistance from the lifting device 72. The lifting device 72 helps to hold the basket in the upright position.

Figure 8:
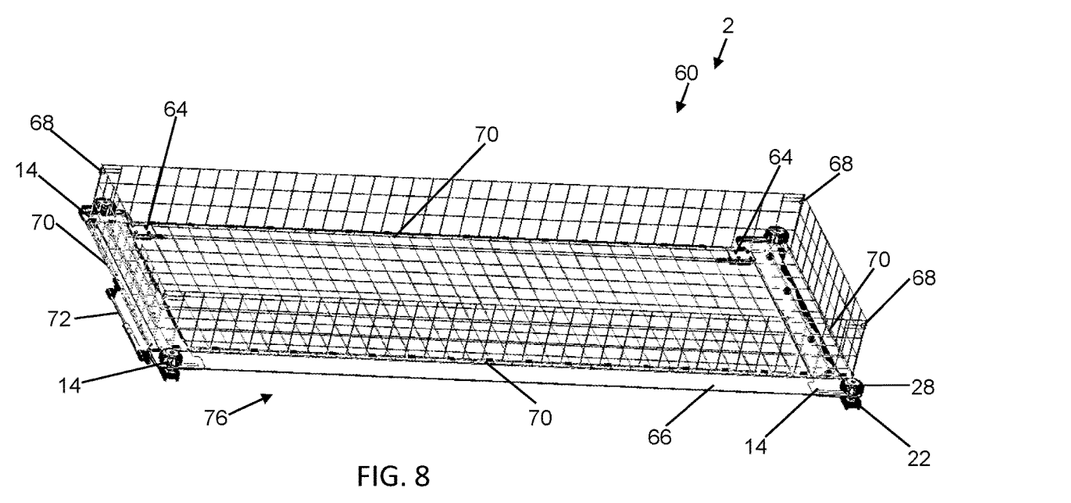
FIG. 8 is a perspective view of the toolbox as a foldable basket.

FIG. 8 is a perspective view of the toolbox 2 as a foldable basket 60. The basket 60 is connected to the mounting plates 14 with a portion of the sliding assembly (only sliding element 22 and quick-release connector 28 shown). The basket mount 66 is shown disposed over mounting plates 14. The fastener of the sliding assembly (not shown) is disposed through the mounting plates 14, through the basket mount 66 and received within the quick-release connector 28. The quick-release connector tightens the sliding assembly, sandwiching the basket mount 66 against the mounting plates 14 in a desired position along the bed rails.

Figure 9:
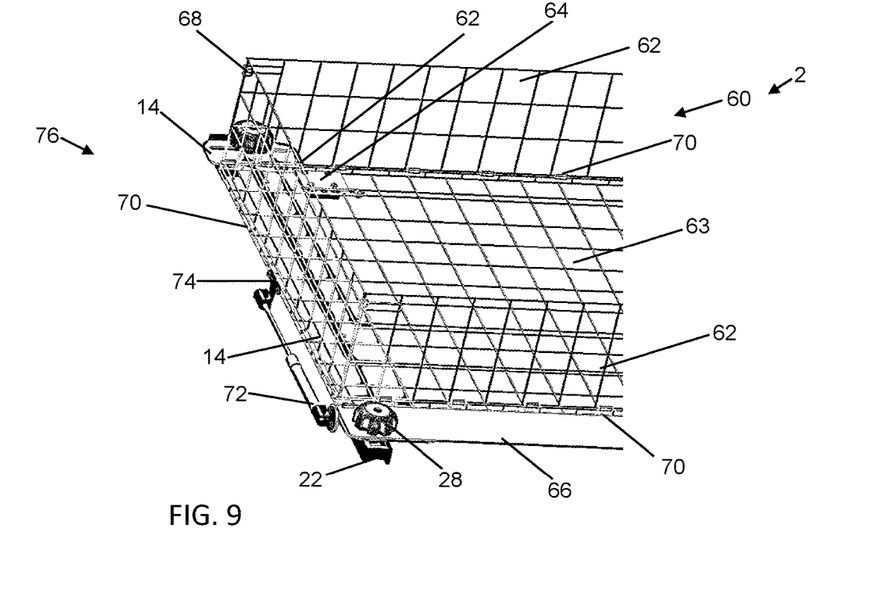
FIG. 9 is a partial view of the toolbox as a foldable basket.

FIG. 9 is a partial view of the toolbox 2 as a foldable basket 60. The basket 60 is in the first position 76. The lifting device 72 is connected with the mounting plate 14 and the basket floor 63 at attachment point 74. The basket floor 63 is disposed over the mounting plates 14 with basket locks 64 engaging the mounting plates to secure the basket in the first position 76.

1 sliding tool box system
2 toolbox
3 toolbox lid
4 bed rails
5 vehicle bed
6 longitudinal bed Wall
7 horizontal plane
8 top surface of the wall
9 bed floor
10 fore position
12 aft position 14 mounting plate
16 positioning holes
18 reinforcement
19 reinforcement holder
20 sliding Assembly
22 sliding element
24 locking element
26 fastener
28 quick-release connector
30 channel
31 channel protrusions
36 tonneau cover
38 tonneau cover rail
40 mounting holes
42 fasteners
44 lid lock
46 lower surface
48 upper surface
50 attachment arm
52 ridges
54 tonneau attachment portion
60 basket
62 basket walls
63 basket floor
64 basket lock
66 basket mount
68 basket wall clips
70 hinge
72 lifting device
74 lifting attachment point
76 first basket position
78 second basket position

I claim:

1. A toolbox system comprising:
i) a toolbox;
ii) a sliding assembly connected to the toolbox; and
iii) a rail assembly comprising: a tonneau rail section for supporting a tonneau cover and a toolbox rail section for supporting the toolbox, the toolbox rail section comprises a channel and channel protrusions, the toolbox rail section configured to be attached to a top surface of a wall defining a cargo area of a vehicle;
wherein the sliding assembly comprises a sliding element comprising a pair of legs surrounding a pair of channel walls defining the channel and a locking element located in the channel, the channel protrusions are compressed between the locking element and the sliding element to lock the toolbox system in the desired location; and
wherein the sliding assembly is configured to slide along a length of the channel to permit movement of the toolbox over a top surface of the tonneau cover between a fore position and an aft position of the cargo area of the vehicle.

2. The toolbox system according to claim 1, wherein the toolbox system comprises a mounting plate provided between an underside of the toolbox and the toolbox rail section, the mounting plate including a positioning hole that is elongated and extends in a direction that is perpendicular to the channel.

3. The toolbox system according to claim 1, wherein the sliding assembly comprises:
a threaded member engaging the locking element; and
a quick-release connector connected to the threaded member;
wherein rotating the quick-release connector causes the locking element to move into engagement with the channel protrusions to lock the sliding assembly and restrict movement of the toolbox.

4. The toolbox system according to claim 1, wherein the toolbox rail section comprises a connector flange and the tonneau rail section comprises a connector flange, and the two connector flanges are connected together to form the rail assembly.

5. The toolbox system according to claim 3, wherein when the quick-release connector is rotated in a tightening direction, the sliding element, the locking element, and the mounting plate are compressed together to lock the toolbox system in a desired position, and
wherein when the quick-release connector is rotated in a loosening direction, the sliding element, the locking element, and the mounting plate are uncompressed, allowing the toolbox system to move.

6. The toolbox system according to claim 1, wherein the channel has a U-shaped cross section and a portion of the sliding assembly that surrounds the channel has a U-shaped cross section.

7. The toolbox system according to claim 1, wherein the sliding assembly comprises a mechanism for moving the locking element within the channel to lock and unlock the sliding assembly.

8. The toolbox system according to claim 7, wherein the mechanism comprises a knob and a threaded member that engages the locking element, wherein turning the knob in a first direction causes the locking element to move into contact with the channel protrusions to lock the sliding assembly.

9. The toolbox system according to claim 8, wherein the toolbox system comprises a pair of sliding assemblies, the sliding assemblies are both located on a driver side of the vehicle, the sliding assemblies are both located at a passenger side of the vehicle, or one of the pair is located on the driver side and the other of the pair is located on the passenger side.

10. The toolbox system according to claim 1, wherein the toolbox rail section is configured to be installed on the top surface of the bed wall of the cargo area, and the tonneau rail section cantilevers from the toolbox rail section in a direction of a center of the cargo area.

11. The toolbox system according to claim 10, wherein the toolbox is a basket.

12. The toolbox system according to claim 11, wherein the basket is configured to pivot relative to the rail assembly, between a horizontal position and a vertical position.

13. The toolbox system according to claim 1, wherein the locking element and the sliding element brought together to increase a force acting on the channel protrusions to lock the sliding assembly.

14. The toolbox system according to claim 1, wherein the channel is defined between two opposing channel walls and each of the channel protrusions cantilever from a respective one of the two opposing channel walls.

15. The toolbox system according to claim 1, wherein the channel protrusions comprise two channel protrusions, and a gap is defined between the two channel protrusions.

16. A toolbox system comprising:
a toolbox comprising a sliding assembly; and
a rail assembly comprising: a tonneau rail section for supporting a tonneau cover and a toolbox rail section for supporting the toolbox, the toolbox rail section comprises a channel and channel protrusions, the toolbox rail section is configured to be attached to a top surface of a wall defining a cargo area of a vehicle;

wherein the sliding assembly comprises: a sliding element comprising a pair of legs surrounding a pair of channel walls defining the channel, a locking element located within the channel, and a knob connected to the locking element, wherein the sliding assembly is configured to slide along a length of the channel to permit movement of the toolbox over a top surface of the tonneau cover between a fore position and an aft position of the cargo area of the vehicle, wherein manipulating the knob in a first direction causes the locking element and the sliding element to be brought together to increase a force acting on the channel protrusions to lock the sliding assembly and restrict the toolbox from moving between the fore position and the aft position, wherein the toolbox system comprises a mounting plate provided between an underside of the toolbox and the toolbox rail section, the mounting plate comprises a positioning hole that is an elongated slot extending in a direction that is perpendicular to the channel, and wherein the sliding assembly comprises a threaded member that extends through the elongated slot and engages both of the locking element and the knob.

17. The toolbox system according to claim 16, wherein the channel has a U-shaped cross section and a portion of the sliding assembly that slides along the length of the channel has a U-shaped cross section that surrounds the U-shaped cross section of the channel.

18. The toolbox system according to claim 17, wherein the channel protrusions are compressed between the locking element and the sliding element to lock the sliding assembly.

* * * * *